United States Patent
Jeng et al.

[11] Patent Number: 5,959,189
[45] Date of Patent: Sep. 28, 1999

[54] TEST APPARATUS FOR LUBRICATION PERFORMANCE OF ROLLING BEARINGS

[75] Inventors: Yeau-Ren Jeng, Tainan; Cheng-Chang Ling, Chia-Yi Hsien; Chih-Chung Gao, Taipei Hsien, all of Taiwan

[73] Assignee: National Science Council, Taipei, Taiwan

[21] Appl. No.: 08/923,976

[22] Filed: Sep. 5, 1997

[30] Foreign Application Priority Data

May 2, 1997 [TW] Taiwan ................................. 86105886

[51] Int. Cl.$^6$ ................................................. G01M 13/04
[52] U.S. Cl. ................................................................ 73/10
[58] Field of Search ........................... 73/9, 10; 384/448; 374/153

[56] References Cited

U.S. PATENT DOCUMENTS

| | | | |
|---|---|---|---|
| 2,471,423 | 5/1949 | Gisser | 73/9 |
| 3,028,746 | 4/1962 | Sonntag et al. | 73/10 |
| 3,375,699 | 4/1968 | Lindeman | 73/10 |
| 3,785,196 | 1/1974 | Smith | 73/10 X |
| 3,939,690 | 2/1976 | Kuss et al. | 73/9 |
| 3,952,566 | 4/1976 | Jacobson | 73/10 |
| 4,217,698 | 8/1980 | Van Sickle | 33/517 |
| 4,763,508 | 8/1988 | Buck | 73/9 |
| 5,031,443 | 7/1991 | Black et al. | 73/10 X |
| 5,072,611 | 12/1991 | Budd et al. | 73/10 X |
| 5,184,503 | 2/1993 | Van den Berg | 73/10 X |
| 5,226,308 | 7/1993 | Gibson | 73/9 |

FOREIGN PATENT DOCUMENTS

| | | | |
|---|---|---|---|
| 144050 | 10/1959 | U.S.S.R. | 73/10 |
| 208311 | 12/1967 | U.S.S.R. | 73/10 |
| 522443 | 9/1976 | U.S.S.R. | 73/9 |
| 827993 | 5/1981 | U.S.S.R. | 73/9 |
| 1550351 | 3/1990 | U.S.S.R. | 73/9 |

*Primary Examiner*—Thomas P. Noland
*Attorney, Agent, or Firm*—Bacon & Thomas

[57] ABSTRACT

An apparatus combining the tests of lubrication systems with performance of rolling bearings is disclosed. The functions include the regulation of axial load and lubrication system and measurement of temperature rise and friction torque of test bearing which are provided to analyze the performance of test bearing under different axial loads, rotating speed and lubrication conditions. The test apparatus consists of loading, testing, linking, power, and base sections. In the loading section, a disc spring can be compressed by an adjustable screw to make up a mechanism for changing axial load on the test bearing. The testing section includes a thermocouple and a mechanism for measurement of friction torque of bearing. The outside of testing section has a protective sleeve for setting holes and pads which are adapted to fix, change and regulate the position, number, and outlet displacement of lubricant nozzles according to different lubrication systems and the actual testing needs. In the linking section, both ends of a rotating spindle connect with the power and the testing sections for delivering the rotating power and driving the test bearing.

11 Claims, 10 Drawing Sheets

TEST APPARATUS FOR LUBRICATION PERFORMANCE OF ROLLING BEARINGS

BACKGROUND OF THE INVENTION

1. Field of the Invention

Rolling bearings have been used for many rotating systems due to their low friction, high rigidity and ability to support a combination of radial and thrust loading. The performance of the bearing assembly and its lubrication system are instrumental in increasing the maximum speed of the rotating system.

A good lubrication system not only can increase the rotating speed and prolong the service life of a bearing assembly, but also has a considerable advantage in reducing the power consumption of the entire system. There are at present several lubrication systems used for rolling bearings, such as grease, oil mist, oil air, and oil jet, etc. The grease lubrication, due to its poor heat transfer capability, is only applied to the rolling bearings operated at a low to medium rotating speed. The heat dissipation of the bearings for use in a high-speed rotation system is an important factor to consider. A suitable lubrication system for high speed operation, such as oil mist, oil air, and oil jet, must be capable of providing the bearings with adequate lubrication and cooling. In these systems, the operating parameters, such as the amount of oil supply, the flow rate of air, and the number of nozzles, have significant effects on the performance of rolling bearings.

An appropriate preload applied to the rolling bearings can eliminate the clearance between the rolling elements and the inner and outer races, and thus increases the rigidity of the rotating spindle. The preload can also reduce the sliding to rolling ratio so that the temperature rise and wear by friction produced due to excessive sliding are able to be prevented. However, a large preload may cause too heavy a load on the bearings, and thus adversely affect the fatigue life, temperature rise and power consumption of the bearings. Therefore, the ability to control the preload (axial load) applied to the rolling bearings within an appropriate range while maintaining a high speed rotation and a long service life for the rolling bearings is an important issue.

2. Description of the Prior Art

Evaluating the performance of rolling bearings is generally done by measuring the following parameters: the friction torque, temperature rise, vibration frequency, and vibration amplitude, etc. These parameters will change as the operation conditions, such as the rotating speed, load and lubrication, of the bearings change. Therefore, the performance testing for the bearings must regulate these conditions. There are many methods at present for measuring these parameters. Typical examples can be found in U.S. Pat. Nos. 3,952,566; 4,729,239; 4,763,508; 5,031,443; 5,184,505; 5,226,308; and 5,477,730.

Some systems disclosed in the above-mentioned U.S. patents can simultaneously measure various parameters, such as the friction torque, temperature rise, and amount of vibration, etc., but the way of applying the load on the bearings and the measurement of vibration with direct contact will interfere with the accuracy of the measurement of the friction torque. The testing apparatus disclosed in U.S. Pat. No. 5,477,730 uses acceleration signals and employs band-pass and digital filtering and envelope detecting techniques, which are vulnerable to the outside interfering signals. Therefore, the testing results of the bearing performance will not be very reliable if the outside interfering signals are not handled cautiously and appropriately. Moreover, some of the testing systems require a costly apparatus, such as a laser.

In the above-mentioned testing systems, there is a critical factor which is not considered. The testing systems are not effectively integrated with a lubricating system to evaluate the performance of the bearings under various lubrication systems. For the rolling bearings, the lubrication system has significant influence on maximum rotating speed and service life. Therefore, an ideal apparatus for testing the performance of rolling bearings should be integrated with a lubrication system that is able to test the rolling bearings under different lubrication conditions.

SUMMARY OF THE INVENTION

Based on the above discussion, a lubrication-system-integrated apparatus for testing the performance of a rolling bearing is disclosed in the present invention, wherein the testing functions of the apparatus are adjustable to meet the lubrication system. Because there are many technical problems to be overcome in measuring the vibration frequency and amplitude without interfering with the measurement of the friction torque, the apparatus of the present invention will measure mainly the temperature rise and the friction torque of the rolling bearing.

The temperature rise and the friction torque of the rolling bearing are important parameters for evaluating operating performance of the bearing. The temperature rise allow one to predict the influence of axial load on the bearings, to determine whether or not the amount of lubricant supply is excessive, to evaluate the cooling efficiency of the lubrication system, and to predict whether the rolling bearing will be broken down under certain operating conditions based on the trend thereof. The friction torque can also be used to obtain the above-mentioned predictions, and further allow one to calculate the power consumption of the bearings. In summary, the lubrication performance of the lubricant system and the operating performance of the bearings can be precisely analyzed, when both the temperature rise and the friction torque parameters can be measured simultaneously.

A test apparatus for lubrication performance of a rolling bearing constructed according to the present invention comprises a testing section including an inner support and an outer support, the inner support and outer support being adapted to install a rolling bearing to be tested therebetween, a loading section comprising a bush mounted on a base; a load cell slidably received in on4e end of the bush, the load cell being movable along an axial direction of the rolling bearing until it is stopped by the outer support, so that an axial load is applied to the outer support, a bolt for adjusting the axial load threadably connected to another end of the bush, and a load generating means disposed in the bush for pushing the load cell against the outer support with a force which is proportional to an advancing distance of the adjusting bolt into the bush. Also provided is a linking section comprising a sleeve fixed on the base, and a rotating spindle installed in the sleeve, wherein both ends of the rotating spindle connect respectively to a motor spindle and the inner support, so that rotation of the motor spindle can be transmitted to the inner support.

The inner support is able to non-rotatably engage with an inner ring of the rolling bearing, such that the inner ring can be driven by the motor spindle via the rotating spindle and the inner support, and the outer support is in the form of a cup body having an open end non-rotatably connected with an outer ring of the rolling bearing, and another end of the cup body is able to be pushed by the load cell so that the axial load acts on the rolling bearing to be tested. A thermocouple is mounted in said cup body for measuring the temperature of the outer ring of the rolling bearing, and one or more holes are formed in the cup body for delivering an outside lubricant inside the cup body for lubricating the rolling bearing.

The test apparatus of the present invention can employ different lubrication systems used for the rolling bearings, for example oil/air lubrication, oil mist lubrication, grease lubrication, etc., with the positions and number of the lubricant nozzles being adjustable. The test apparatus of the present invention also contains a load generating means for adjusting the axial load (or preload) applied on the rolling bearing. The temperature rise and friction torque of the rolling bearing are observed under various axial loads, rotating speed and various lubrication conditions of different lubrication systems so that optimal operation conditions and optimal lubrication conditions for the rolling bearing under different lubrication systems can be studied. The lubrication parameters which can be changed in the oil/air and oil mist lubrication systems include the position and number of nozzles, and the amount of oil supply and the flow rate of compressed air. The grease lubrication system parameters are determined by the kind of grease.

Preferably, the cup body of the test apparatus of the present invention has a friction torque press block perpendicular to the another end of the cup body, and the friction torque press block is adapted to contact a friction torque sensing means for measuring a torque given by the friction torque press block.

Preferably, the friction torque sensing means of the test apparatus of the present invention comprises a support fixed on the base, a cone-shaped stopper and a friction torque sensor connecting the stopper to the support, wherein the stopper is at a point contact with said friction torque press block, and the friction torque sensor measures the torque generated by the friction torque press block via the stopper.

Preferably, the load generating means of the test apparatus of the present invention comprises a ball bush mounted on the one end of the bush of the loading section, the ball bush having a center through hold and an outer surface; a load push rod slidably received in a center through hole of the ball bush, the load push rod being connected to the load cell at one end thereof; a spring bush having one end slidably mounted on the outer surface of the ball bush; a disc spring elastically bounded between another end of the load push rod and another end of the spring bush, so that the disc spring is compressed when the another end of the spring bush is pushed by the adjusting bolt and moves on the outer surface of the ball bush, and thus the load push rod is acted upon by an elastic force from the compressed disc spring. More preferably, the load push rod is supported in the center through hole of the bush by a plurality of rolling balls with lubrication grease.

Preferably, the cup body of the outer support of the test apparatus further has a load push stand at the another end thereof, the load push stand is in a point contact with the load cell, wherein surfaces of the load push stand and the load sensing making point contact are subjected to a hardening treatment.

Preferably, the testing section of the test apparatus further comprises a protective sleeve, and the protective sleeve has one or more threaded axial holes which are aligned with the one or more penetrating holes of the outer support, so that one or more lubricant nozzles can be threadably engaged with the one or more axial holes with ends thereof inserting into one or more holes of the outer support.

Preferably, the rotating spindle of the linking section and the inner support are non-rotatably connected with each other with a key simultaneously received in a key-groove formed on one end of the rotating spindle and a key-groove formed on one end of the inner support contacting the one end of the rotating spindle.

The test apparatus for lubrication performance of a rolling bearing of the present invention functions as follows:

1. measuring the temperature of the rolling bearing;

2. measuring the friction torque of the rolling bearing;

3. adjusting the axial load (or preload) applied to the rolling bearing;

4. changing the number of lubricant nozzles; and 5. adjusting the position of the lubricant nozzle.

Description of the numerals in drawings;

| | |
|---|---|
| 1 . . . loading section | 2 . . . testing section |
| 3 . . . linking section | 4 . . . power section |
| 5 . . . base | |
| 6 . . . supporting stand of loading section | |
| 7 . . . supporting stand of linking section | |
| 8 . . . supporting stand of power section | |
| 9 . . . bolt for adjusting load | 10 . . . fastening nut |
| 11, 20 . . . end cover of loading section | |
| 12 . . . loading section bush | 13 . . . spring bush |
| 14, 16 . . . spring pad | 15 . . . disc spring |
| 17 . . . load push rod | 18 . . . ball bush |
| 19 . . . ball | 21 . . . load push disk |
| 22 . . . load cell | 23 . . . load push stand |
| 24 . . . outer support for bearing | 25 . . . protective sleeve |
| 26 . . . lubricant nozzle | 27 . . . nozzle pad |
| 28 . . . test bearing | 29 . . . inner support for bearing |
| 30 . . . thermocouple | 31 . . . linking plate |
| 32 . . . rotating spindle | |
| 33, 43 . . . front and rear end covers of linking section | |
| 34 . . . linking section sleeve | |
| 35, 36, 37 . . . ball bearing with grease lubrication | |
| 38, 39 . . . inner and outer sealing rings | |
| 40, 41 . . . inner and outer spacer rings | |
| 42 . . . compression spring | 44 . . . end pressing ring |
| 45 . . . locking nut for bearing | 46 . . . coupling |
| 47 . . . motor spindle of power section | |
| 48 . . . motor of power section | 51 . . . oil air inlet |
| 52A, 52B . . . two drill holes on nozzle | |
| 53 . . . major passage | 54 . . . minor passage |
| 55 . . . nozzle main body | 60 . . . friction torque support |
| 61 . . . friction torque sensor | 62 . . . friction torque stopper |
| 63 . . . friction torque press block | 65A, 65B . . . drill hole |
| 70, 71, 72, 73, 74, 75 receiving hole for lubricant nozzle | |
| 76, 77, 78, 79 . . . tapping hole | |
| 82A, 82B . . . friction torque mounting pad | |
| 85 . . . II-shaped steel | 91 . . . drill hole |
| 92, 100A, 100B . . . key-groove | 93A, 93B . . . linking key |
| 94A, 94B, 97 . . . locking bolt | 101 . . . front end of rotating spindle |
| 102, 103A, 103B . . . threaded hole | 104 . . . thread |
| 105A, 105B . . . milled surface | |

DETAILED DESCRIPTION OF THE INVENTION

Figure 1:
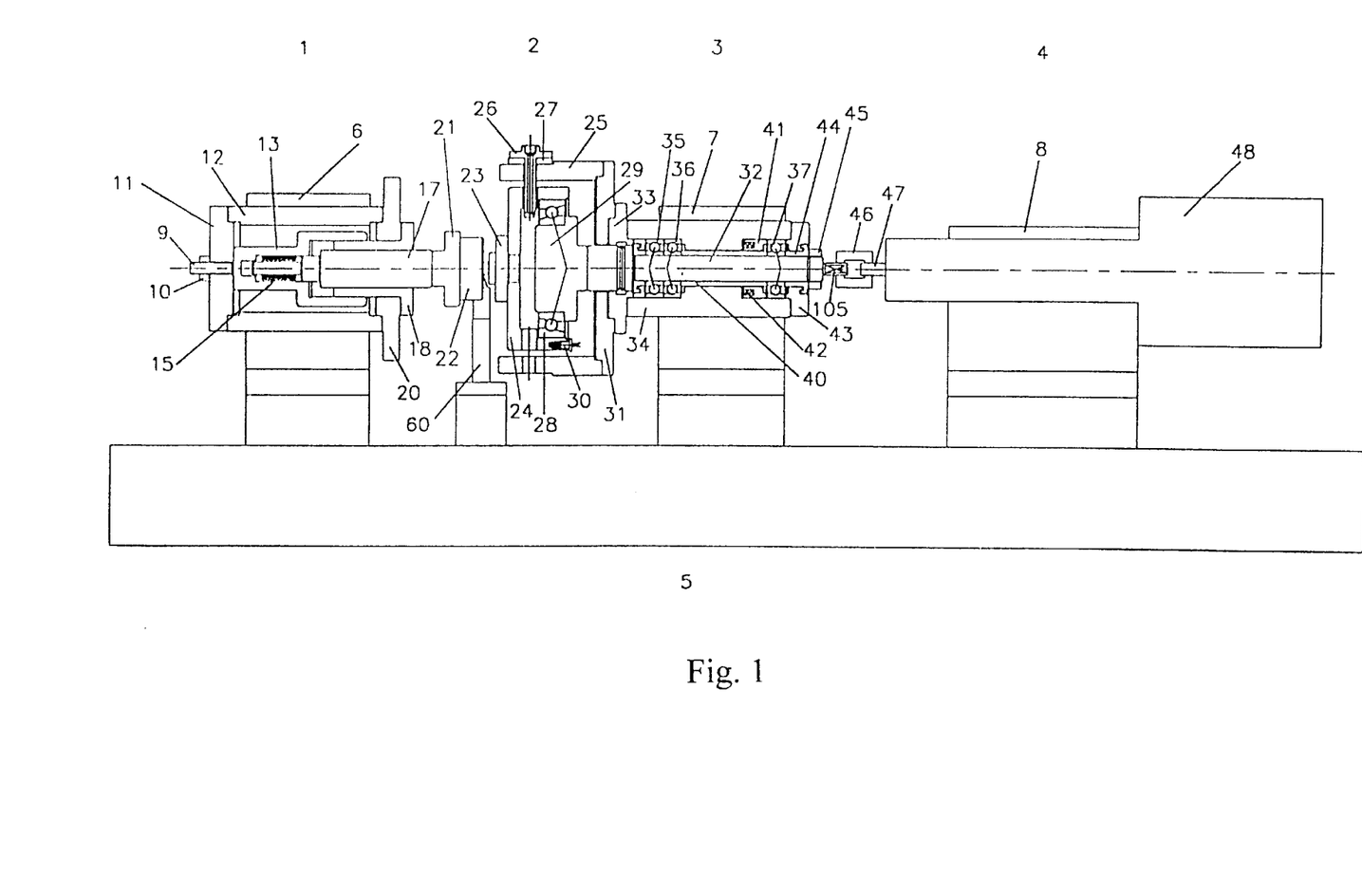
FIG. 1 is a schematic view of an apparatus for testing the lubrication performance of a rolling bearing according to the present invention, showing the relationship between different sections of the test apparatus.

The present invention is a test apparatus for testing the lubrication performance of a rolling bearing. FIG. 1 shows the test apparatus of the present invention in assembled form, which comprises a loading section (1), a testing section (2), a linking section (3), a power section (4) and a base (5). An axial load (or preload) on a test bearing (28) is provided by the loading section (1), and the test bearing (28) is installed between an inner support and an outer support (29, 24) located in the testing section (2). In the testing section (2), one or more lubricant nozzles (26) are mounted, and the friction torque and outer race temperature of the test bearing (28) are measured, wherein the number and the mounting positions of the lubricant nozzles (26) can be changed. The linking section (3) is a bridge linking the testing section (2) to the power section (4), in which rotating power from the motor of the power section (48) is transmitted to the test bearing (28). The loading section (1), the linking section (3) and the power section (4) are installed on the base (5) through three supporting stands (6, 7, 8), respectively. Two parts of the testing section (2) are connected to the linking section (3). First, the protective sleeve (25) is connected with a linking plate (31) of the linking section (3), and second, the inner support (29) is connected with the rotating spindle (32) by means of a locking bolt (97 in FIG. 7).

Figure 2:
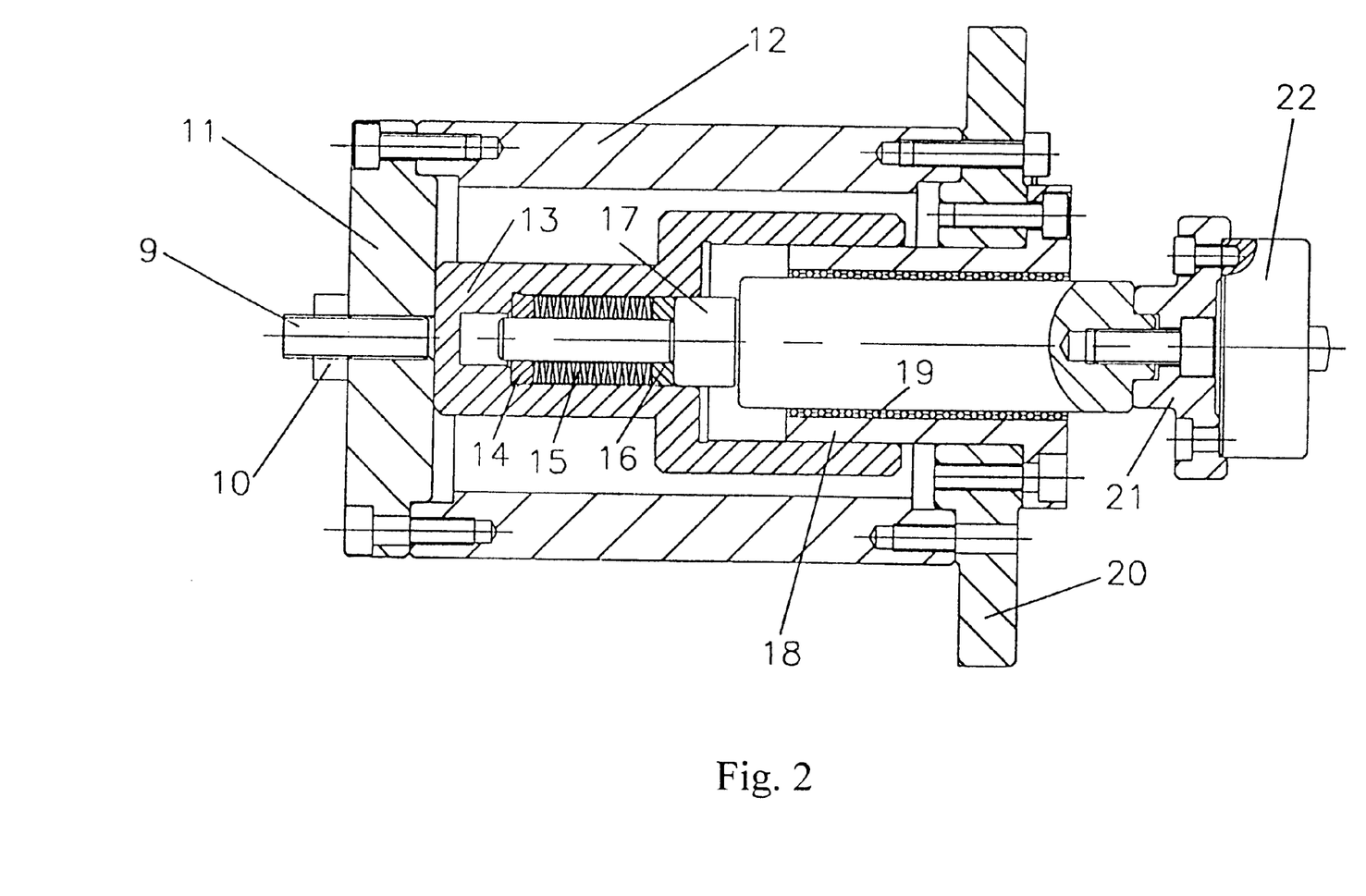
FIG. 2 is a sectional view of a loading section (1) in FIG. 1, showing an axial load (or preload) generating mechanism.

Referring to FIG. 2 which is a sectional view of the loading section (1) in FIG. 1, the axial load (or preload) is generated in this section by compressing a disc spring (15). The loading section (1) contains a loading section bush (12), two end covers (11, 20), a bolt for adjusting load (9), a fastening nut (10), a spring bush (13), two spring pads (14, 16), the disc spring (15), a load push rod (17), a ball bush (18), a plurality of balls (19), a load push disk (21), and a load cell (22). The loading section bush (12) is fastened between the end covers (11, 20), the load push rod (17) is fastened to the load push disk (21), the load push disk (21) is fastened to the load cell (22), and the ball bush (18) is fastened to the end cover (20) by a plurality of inner hexagon-headed bolts. When the bolt of adjusting load (9) is driven in a threaded hole provided in the end cover (11), the spring bush (13) is pushed so that a compression force is generated by the disc spring (15), and thus the load push rod (17), the load push disk (21) and the load cell (22) are pushed against a load push stand (23 in FIG. 1), whereby an axial load is applied to the test bearing (28) in FIG. 1. A fastening nut (10) is provided on the adjusting bolt (9) to prevent the amount of axial load from changing due to vibration. The load cell (22) is wired to a computer (not shown) in order to provide the amount of axial load. There are three groups of disc springs (15) for applying o-20 kg, 20–50 kg and 50–100 kg of axial loads, respectively. A suitable range of axial loading can thus be chosen according to the test bearing.

Figure 3:
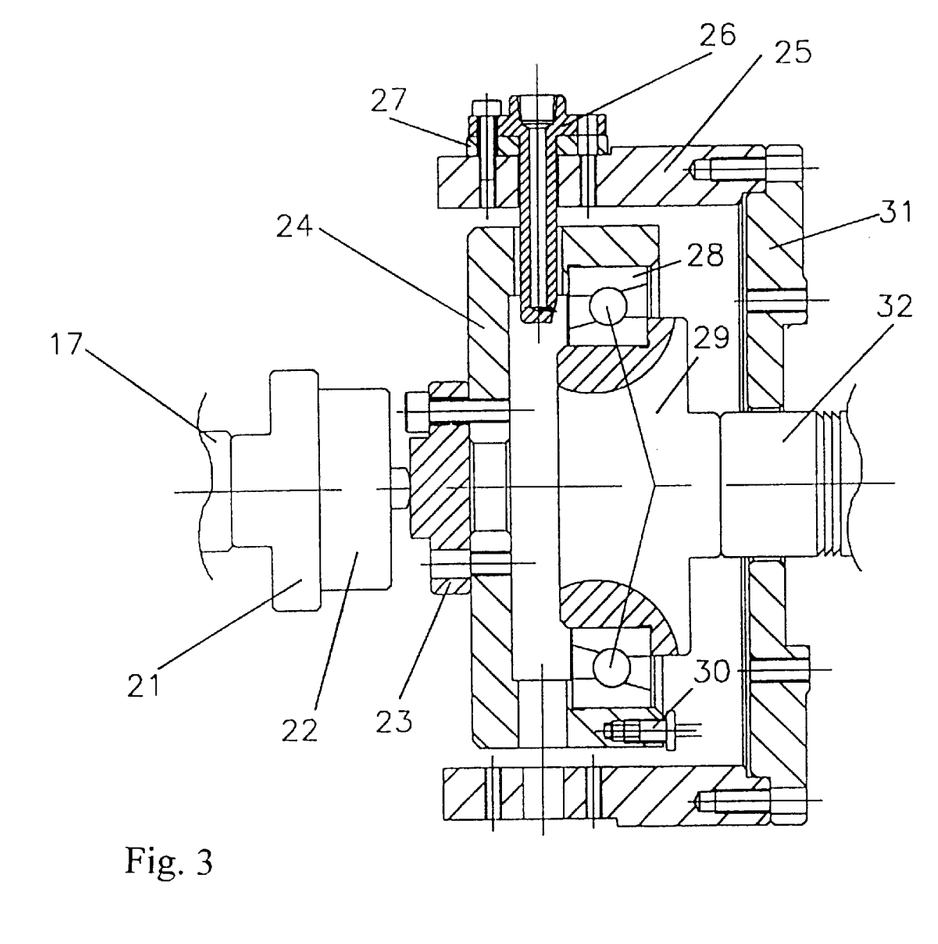
FIG. 3 is a sectional view of a testing section (2) in FIG. 1, showing the relationship between the loading section (1) and the testing section (2), and the relative position between the lubricant nozzles (26) and the test bearing (28).

FIG. 3 is a sectional view of the testing section (2). The test bearing (28) is secured between the inner support and outer support for bearing (29, 24), and the load push stand (23) is secured on the outer support (24) by bolts, as shown in FIG. 3. When the load cell (22) pushes the load push stand (23), an axial load is applied to the test bearing (28). Each of the protective sleeves (25) and the outer support (24) has six receiving holes for installing the lubricant nozzles (26), which are aligned with each other. Any two of the adjacent receiving holes is spaced by an angle of 60°, and the number of the lubricant nozzles (26) installed can be changed according to the practical testing requirements. A nozzle pad (27) is provided between the lubricant nozzle (26) and the protective sleeve (25), and the lubricant nozzle (26) together with the nozzle pad (27) can be secured on the protective sleeve (25) through the use of two bolts. A nozzle pad (27) having a different height may be used for adjusting the distance between the nozzle (26) and the test bearing (28). A thermocouple (30) is mounted at one end of the outer support (24) for measuring the temperature of the outer race of the test bearing (28). The protective sleeve (25) is fastened to the linking plate (31) by a plurality of bolts, and the inner support (29) is linked to a rotating spindle (32) of the linking section to drive the test bearing (28).

Figure 4:
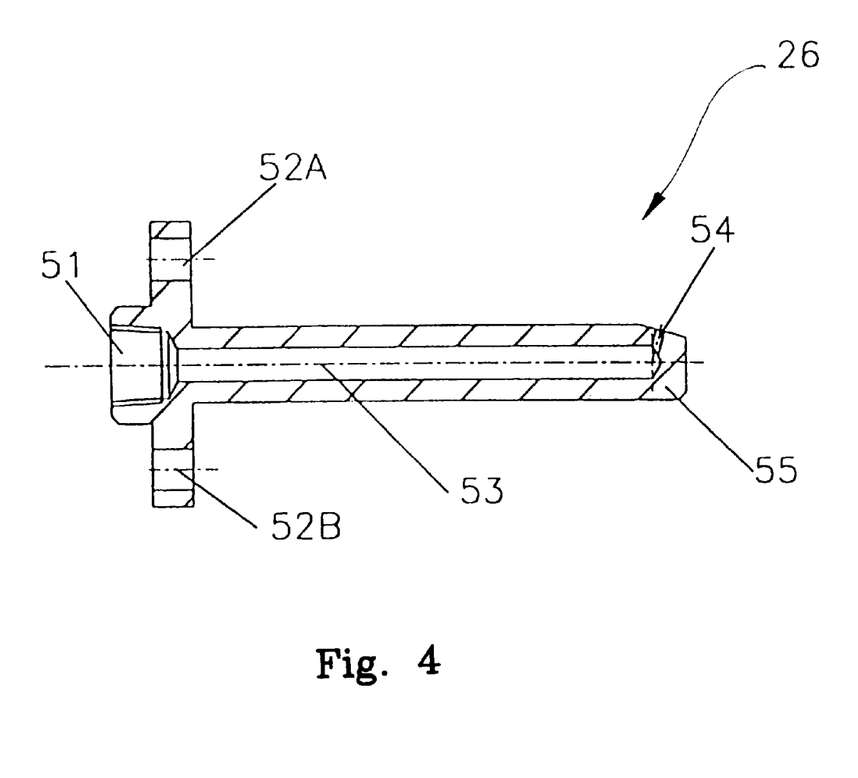
FIGS. 4 and 4A are enlarged views of a lubricant nozzle shown in FIG. 3.
Figure 4A:
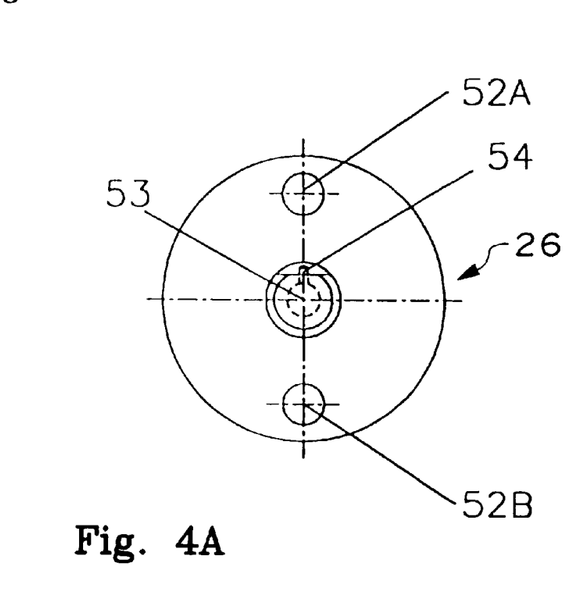

FIGS. 4 and 4A are sectional views of the lubrication nozzle (26) in FIG. 3. As shown in FIG. 4, a threaded bore (51) is provided at a lubricant inlet for connection to an oil or oil mist line for lubricating the test bearing, or directly connect to a compressed air line for dissipating heat from the test bearing. After oil/air, oil mist or compressed air is introduced into the nozzle (26), it will pass through a major passage (53), then a minor passage (54) and finally eject therefrom. The minor passage (54) is formed with an angle of 75° with respect to the major passage (53), and an inclined plate is formed at an exit of the minor passage (54) on the nozzle main body (55) so that the minor passage (54) is vertical to the inclined plane. The nozzle (26) is provided with a flange having two drill holes (52A, 52B) for mounting itself on the protective sleeve (25) of the testing section by means of a plurality of bolts.

Figure 5:
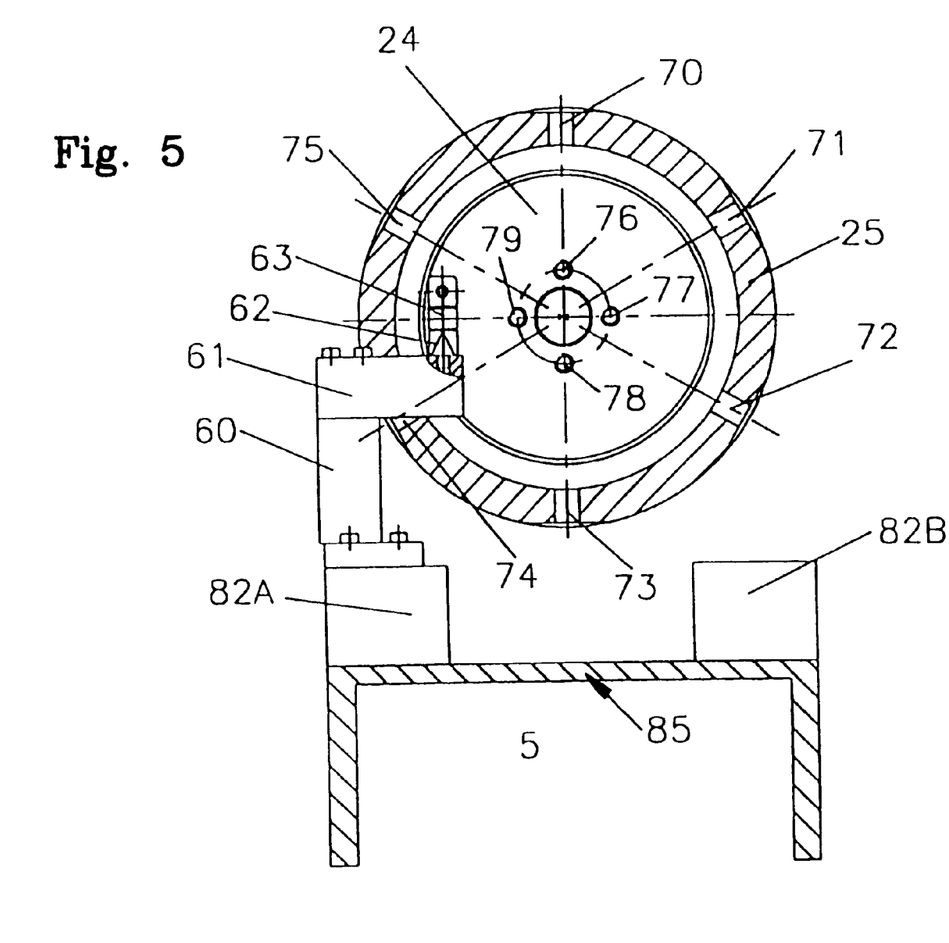
FIGS. 5 and 5A are partial sectional views of the testing section in FIG. 1, showing a measuring mechanism for the friction torque of the bearing and the nozzle installing positions.
Figure 5A:
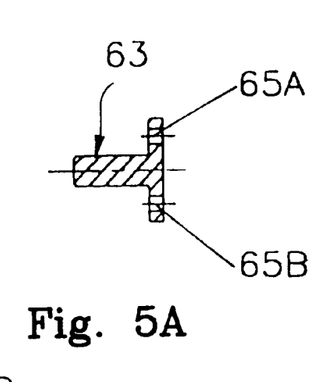

FIGS. 5 and 5A are partial sectional views of the testing section (2). A friction torque sensor (61) with a friction torque stopper (62) thereon are installed on a friction torque support (60), as shown in FIG. 5. The friction torque support (60) is mounted on a friction torque mounting pad (82A) or (82B) in accordance with the rotating direction of the test bearing. The mounting pads are welded on the base (5) of a II-shaped steel (85). A friction torque press block (63), as shown in FIG. 5B, having two drill holes (65A, 65B) is fixed to the outer support (24) by bolts. The press block (63) transmits the friction torque from the test bearing (28) to the stopper (62) and acts on the friction torque sensor (61) in which the friction torque is transformed into force data. The force measured is multiplied by the distance from the center of the outer support (24) to the center of the friction torque press block (63) to obtain a true friction torque. There are six receiving holes (70, 71, 72, 73, 74, 75) for lubricant nozzles on the protective sleeves. Each of the six receiving holes (70, 71, 72, 73, 74, 75) is provided with a tapping hole (not shown) on each side for fastening thereto a lubricant nozzle (26) and a nozzle pad (27). There are four tapping holes (76, 77, 78, 79) on the outer support (24), to which the load push stand (23 in FIG. 3) is mounted by using a plurality of inner hexagon-headed bolts.

As shown in FIG. 3, in order to permit near point contact between the load cell (22) and the load push stand (23) and thus enhance the measuring precision of the friction torque, the load push stand (23) must be subjected to a hardening treatment.

Figure 6:
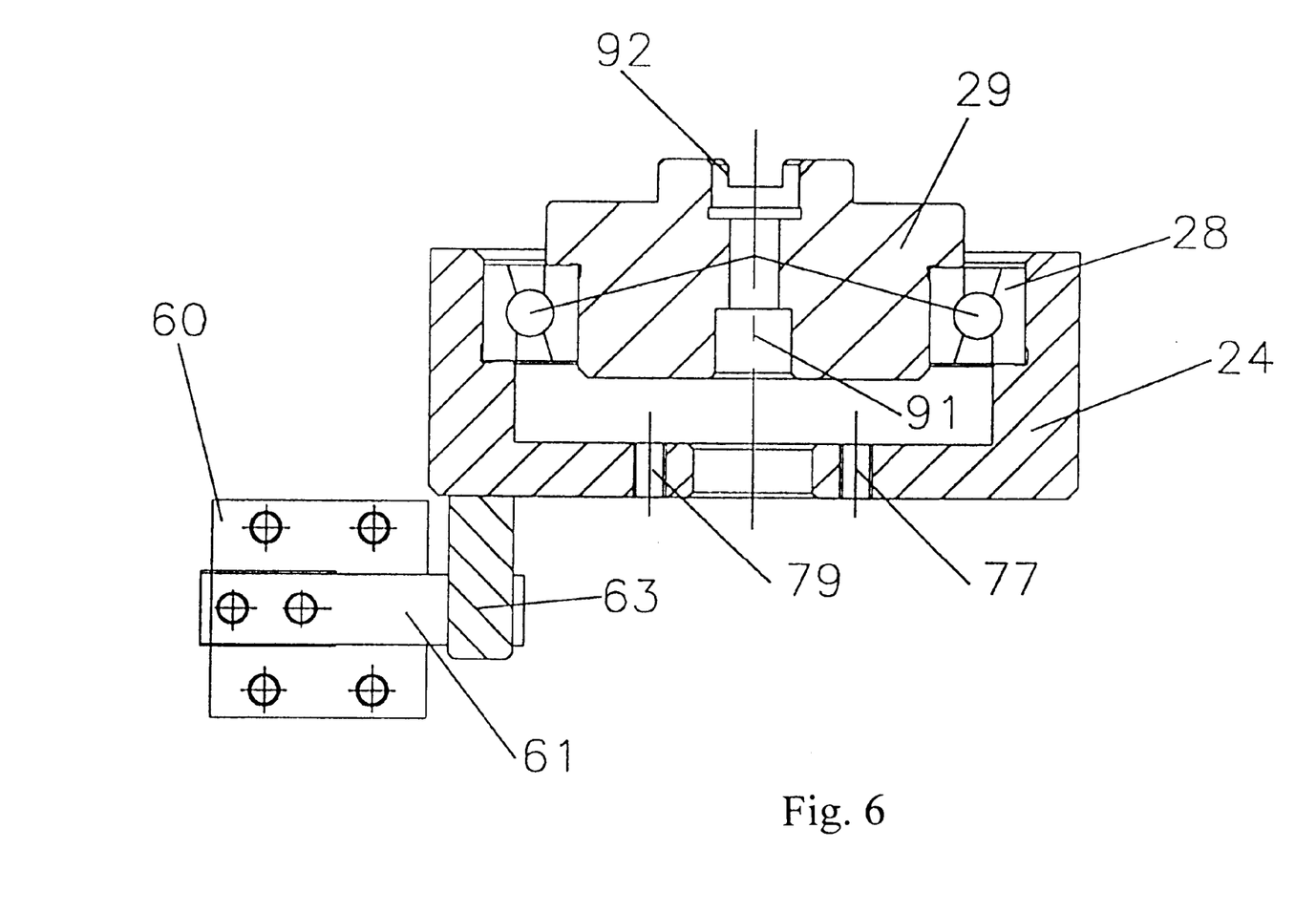
FIG. 6 is a partial horizontal sectional view of the testing section in FIG. 1, and showing the measuring mechanism for the friction torque of the bearing and the structure of an inner support for the bearing.
Figure 7:
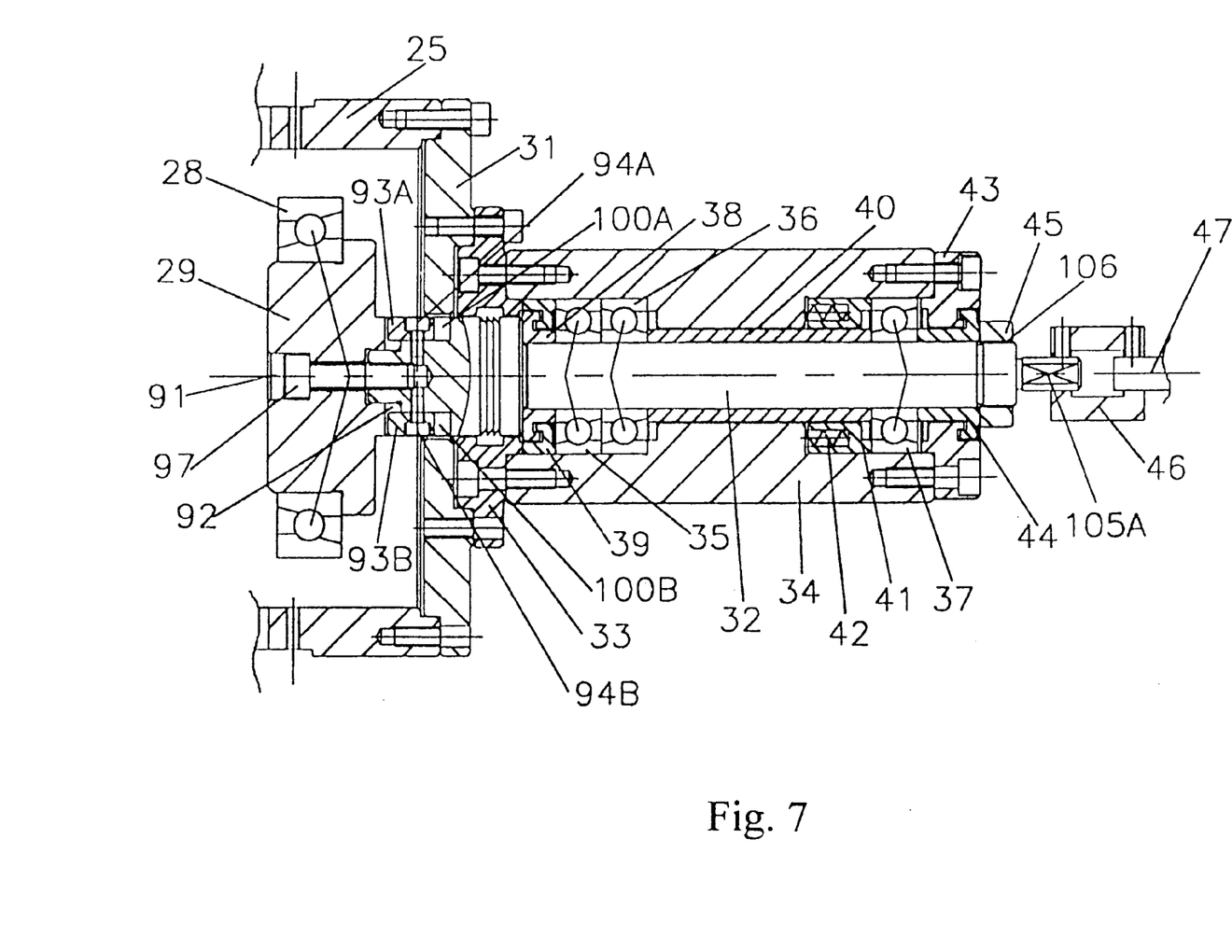
FIG. 7 is a sectional view of a linking section in FIG. 1, showing a structure of the linking section and a linking mode between the testing section and a power section.

FIG. 6 is a partial horizontal sectional view of the testing section (2) in FIG. 1. The relative positions of the friction torque support (60), the friction torque sensor (61) and the friction torque press block (63) can be seen more clearly from this drawing. As shown in FIG. 6, the inner support (29) for the test bearing (28) has a drill hole (91), and two key-grooves (92) at one end of the drill hole (91). An inner hexagon-headed bolt is used to connect the inner support (29) to the rotating spindle (32) of the linking section via the drill hole (91) as shown in FIG. 7. The key-grooves (92) of the inner support (29) have two linking keys (93A, 93B) that are used to connect the inner support (29) to the rotating spindle (32). Therefore, the rotating power is transmitted from the rotating spindle (32) to the inner sport (29) by not only the locking force of the bolt, but also the linking key.

Figures 8, 8A, 8B, 8D:
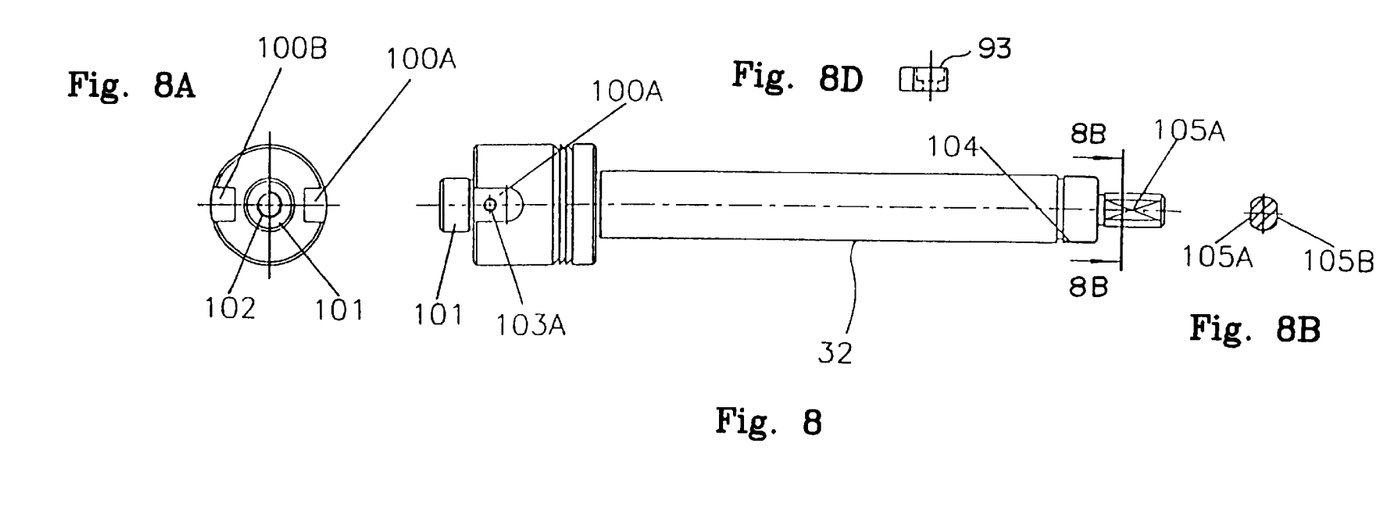
FIG. 8 and FIGS. 8A–8D are schematic views showing a working spindle of the linking section in FIG. 7 and linking keys.

FIG. 7 is a sectional view of the linking section (3) in FIG. 1. As shown in FIG. 7, the linking section (3) contains the rotating spindle (32), a front and rear end cover (33, 43), a linking section sleeve (34) between the front and rear end cover (35, 36, 37) on the rotating spindle (32), an inner and outer sealing rings (38, 39), an inner and outer spacer rings (40, 41), a compression spring (42), an end pressing ring (44), a locking nut (45), two linking keys (93A, 93B) between the inner support (29) and the rotating spindle (32), and a plurality of locking bolts (94A, 94B). A threaded hole (102), as shown in FIG. 8, is provided at the center of the rotating spindle (32) and at the end adjacent to the inner support (29), and two key-grooves (100A, 100B) are provided on the outer surface of the rotating spindle (32) at the same end. The inner support (29) is connected to the rotating spindle by threading a bolt (97) via the drill hole (91) into the threaded hole (102), and by inserting two linking keys (93A, 93B) into the key-grooves (92) of the inner support and the key-grooves (100A, 100B) of the rotating spindle (32). Two locking bolts (94A, 94B) are used to keep the linking keys (93A, 93B) in place, which in turn prevents the locking bolt (97) from loosening due to the rotation of the rotating spindle (32). The outer spacer ring (41) bears eight spring holes which are equally-spaced, and in which eight compression springs (42) are disposed. These compression springs (42) can provide the required preload to ball bearings (25, 26, 27). A flexible coupling (46) connects the rotating spindle (32) with the motor spindle (47) of the power section for transmitting the rotation power. When changing the test bearing, the coupling (46) must be secured by a hand tool so that the locking bolts (97) can be loosened from the threaded hole (102) in rotating spindle (32).

Figure 8C:
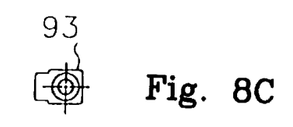

FIGS. 8, 8C and 8D show the rotating spindle (32) and the linking keys (93). As shown in FIG. 8, one end of the rotating spindle (32) bearings two key-grooves (100A, 100B), and two threaded holes (103A) are provided in these key-grooves for the locking bolts (94A, 94B in FIG. 7). Another end of the rotating spindle (32) adjacent to the power section bears a threaded surface (104) for receiving the locking nut (45 in FIG. 7) so that the three ball bearings (35, 36, 37 in FIG. 7) are fixed on the rotating spindle (32). This end of the rotating spindle also bears two milled and hardened surfaces (105A, 105B). The milled surfaces (105A, 105B) are assembled with the flexible coupling (46) shown in FIG. 7.

The function and features of the present invention have been explained above. Because of the maximum speed of this apparatus, up to 24,000 rpm, the rotation precision of the motor, spindles and test bearing are critical to the results, and thus all the rotating elements must pass the test of dynamic balance.

Experiments were carried out by using the test apparatus shown in FIGS. 1–8, wherein a commercially available bearing SNFA VEX 50 was uses as the test bearing, and the DN value of the experiments is $1.1 \times 10^6$. The experimental conditions are listed as follows:

- ambient temperature: 24° C.
- lubrication mode: oil air lubrication
- amount of per oil mist: 0.01 cc
- viscosity of lubrication oil: 32 cSt
- length of oil supply hose: 2 m
- amount of oil supply: 0.08 cc/hr
- rotation speed: 17,000 RPM
- amount of preload: 40 kg
- flow rate of air: 45 liter/min
- number of nozzle: 1

Figure 9:
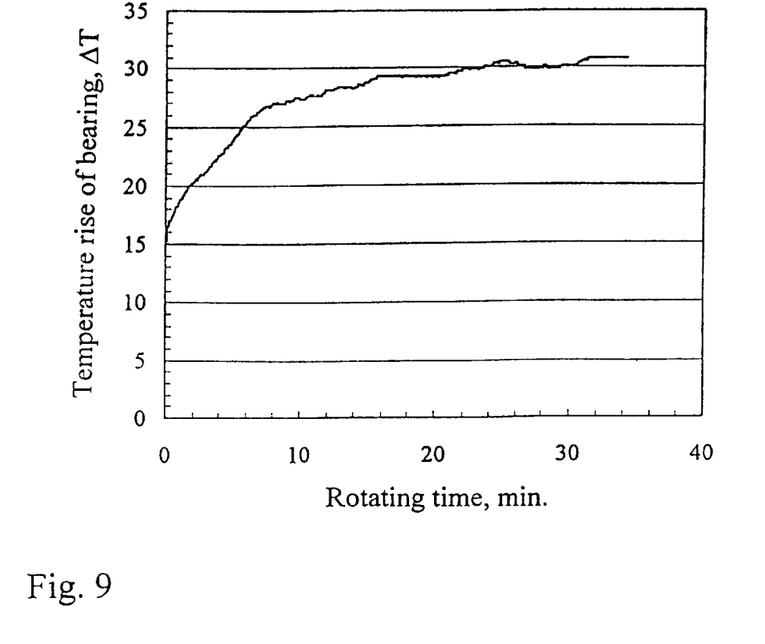
FIG. 9 is a plot showing the relationship between the temperature rise and the rotating time, in which a SNFA VEX 50 bearing was tested by the apparatus of the present invention at a speed of 17,000 rpm.
Figure 10:
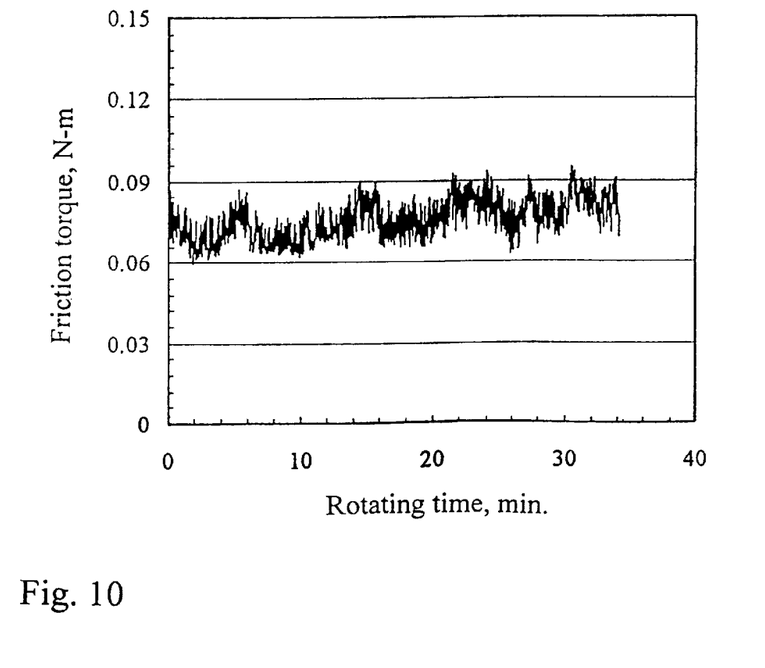
FIG. 10 is a plot showing a relationship between the friction torque and the rotating time, in which a SNFA VEX 50 bearing was tested by the apparatus of the present invention at a speed of 17,000 rpm.

The measured values of the temperature rise and friction torque are shown in FIGS. 9 and 10. It can be seen from FIGS. 9 and 10 that the test apparatus of the present invention has reliable test results at a high rotation speed.

Figure 11:
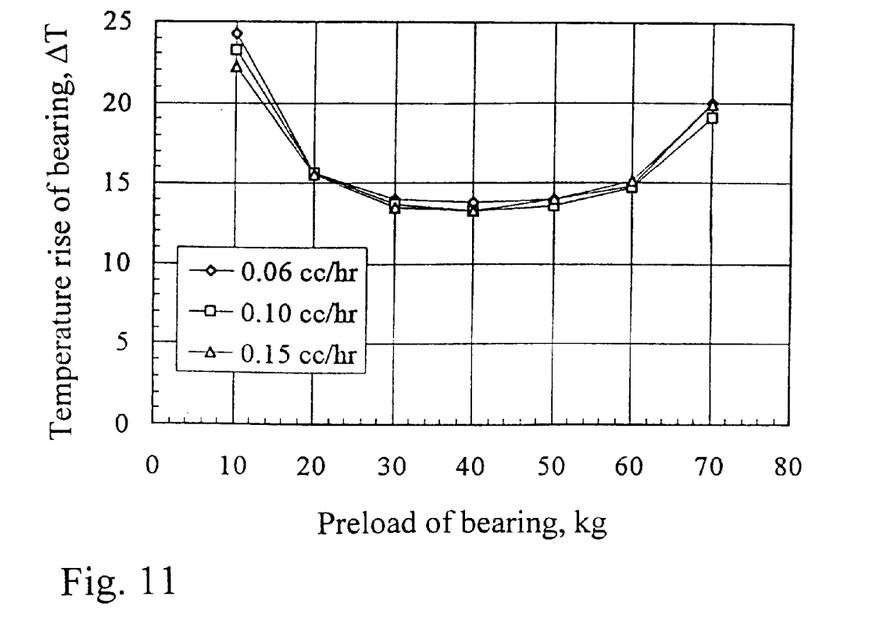
FIG. 11 is a plot showing a relationship between the temperature rise and the amount of preload for different amounts of lubricant supply, in which a SNFA VEX 50 bearing was tested by the apparatus of the present invention at a speed of 15,000 rpm.
Figure 12:
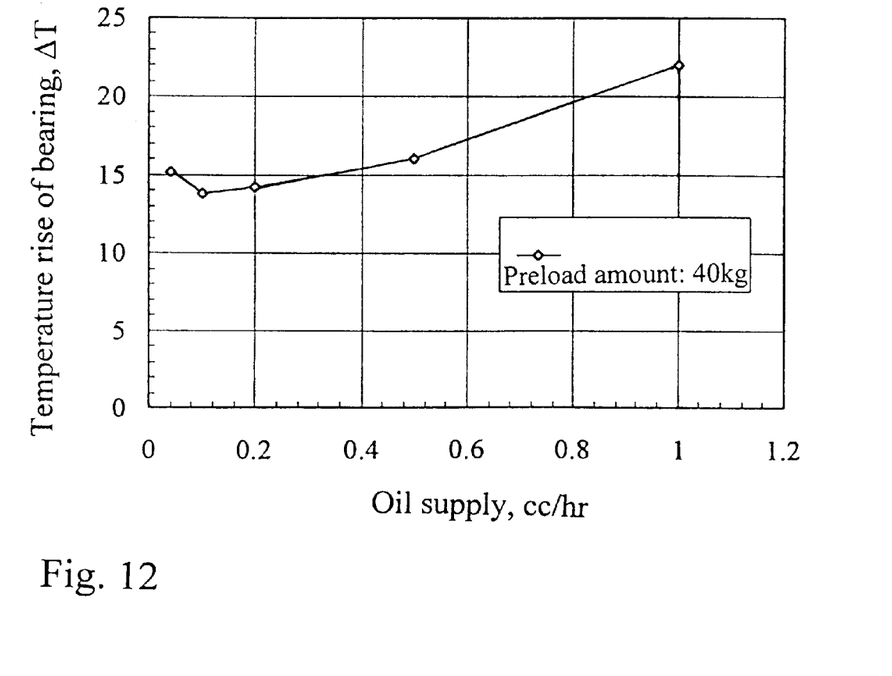
FIG. 12 is a plot showing the relationship between the temperature rise and the amount of lubricant supply, in which a SNFA VEX 50 bearing was tested by the apparatus of the present invention at a speed of 15,000 rpm.

FIG. 11 shows the experimental data of the temperature rise of the SNFA VEX 50 bearing under different axial loads for various amounts of oil supply. FIG. 12 shows the experimental data of the temperature rise of the SNFA VEX 50 bearing under different amounts of oil supply at a fixed axial load of 40 kg. The other experimental conditions used in FIGS. 11 and 12 are listed as follows:

- ambient temperature: 24° C.
- rotation speed: 15,000 RPM
- flow rate of air: 45 liter/min
- number of nozzle: 1

According to the testing data shown in FIGS. 11 and 12, the testing results obtained by using the apparatus of the present invention under high speed are reliable and stable.

What is claimed is:

1. A test apparatus for lubrication performance of a rolling bearing comprising:

a testing section comprising an inner support and an outer support, said inner support and said outer support being adapted to install a rolling bearing to be tested therebetween;

a loading section comprising a bush fixedly mounted on a base; a load cell slidably received in one end of the bush, said load cell being movable along a axial direction of said rolling bearing until it is stopped by said outer support, so that an axial load is applied to the outer support; an bolt for adjusting said axial load threadably connected to another end of said bush; and a load generating means disposed in said bush for pushing said load cell against said outer support with a force which is proportional to an advancing distance of said adjusting bolt into said bush;

a linking section comprising a sleeve fixed on the base, and a rotating spindle installed in said sleeve, wherein both ends of the rotating spindle connect respectively to a motor spindle and the inner support, so that a rotation of the motor spindle can be transmitted to the inner support;

wherein the inner support is able to non-rotatably engage with an inner ring of the rolling bearing, such that the inner ring can be driven by the motor spindle via said rotating spindle and said inner support; and the outer support is in the form of a cup body, an open end of the cup body is non-rotatably connected with an outer ring of said rolling bearing, and another end of said cup body is able to be pushed by said load cell so that said axial load acts on the rolling bearing to be tested, wherein a thermocouple is mounted in said cup body for measuring a temperature of the outer ring of the rolling bearing, and one or more penetrating holes are formed in said cup body for delivering an outside lubricant inside said cup body so that said rolling bearing is lubricated.

2. The test apparatus of claim 1 further comprising a power section in which a motor having said motor spindle is disposed on said base.

3. The test apparatus of claim 1, wherein said cup body has a friction torque press block perpendicular to said another end of the cup body, and said friction torque press block is adapted to contact a friction torque sensing means for measuring a torque given by said friction torque press block.

4. The test apparatus of claim 3, wherein said friction torque sensing means comprises a support fixed on the base, a cone-shaped stopper and a friction torque sensor connecting the stopper to the support, wherein the stopper is in a point contact with said friction torque press block, and said friction torque sensor measures said torque given by said friction torque press block via the stopper.

5. The test apparatus of claim 1, wherein said one and more penetrating holes are six penetrating holes and any two of the penetrating holes are spaced by an angle of 60° on said cup body.

6. The test apparatus of claim 1, wherein said load generating means comprises a ball bush mounted on said one end of said bush of said loading section, said ball bush having a center through hole and an outer surface; a load push rod slidably received in said center through hole of said ball bush, said load push rod being connected to said load cell at one end thereof; a spring bush of which one end is slidably mounted on said outer surface of said ball bush; a disc spring which is elastically bounded between another end of said load push rod and another end of said spring bush, so that the disc spring is compressed when said another end of the spring bush is pushed by said adjusting bolt and moves on said outer surface of the ball bush, and thus the load push rod is acted by an elastic force resulted from the compressed disc spring.

7. The test apparatus of claim 6, wherein said disc spring is used for light, middle or heavy axial load, wherein the light axial load ranges from 0 to 20 kg, middle axial load ranges from 20 to 50 kg, and the heavy axial load ranges from 50 to 100 kg.

8. The test apparatus of claim 6, wherein said load push rod is supported in the center through hole of said bush by a plurality of rolling balls with lubrication grease.

9. The test apparatus of claim 1, wherein said cup body of said outer support further has a load push stand at said another end thereof, said load push stand is in a point contact with said load cell, wherein surfaces of said load push stand and the load sensing making said point contact are objected to a hardening treatment.

10. The test apparatus of claim 1, wherein the testing section further comprises a protective sleeve, and said protective sleeve has one or more threaded axial holes which are aligned with said one or more penetrating holes of said outer support, so that one or more lubricant nozzles can be threadably engaged with said one or more axial holes with one ends thereof inserting into said one or more penetrating holes of said outer support.

11. The test apparatus of claim 1, wherein said rotating spindle of the linking section and said inner support are non-rotatably connected with each other with a key simultaneously received in a key-groove formed on one end of said rotating spindle and a key-groove formed on one end of said inner support contacting said one end of said rotating spindle.

\* \* \* \* \*